June 12, 1962     C. VAN DER LELY ET AL     3,038,643
DEVICES FOR SPREADING GRANULAR OR POWDERY MATERIAL
Filed Jan. 26, 1959     4 Sheets-Sheet 1
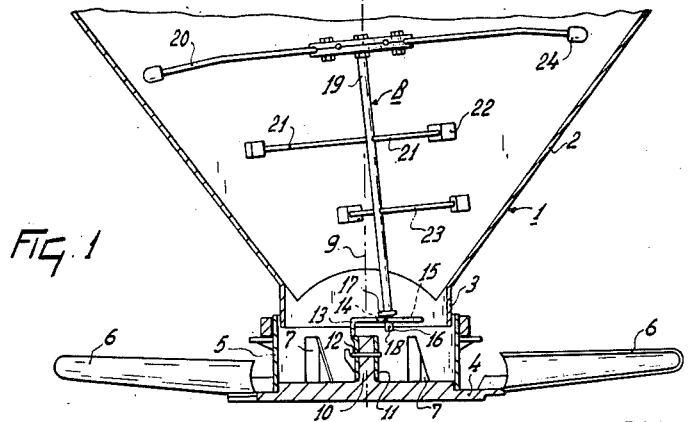
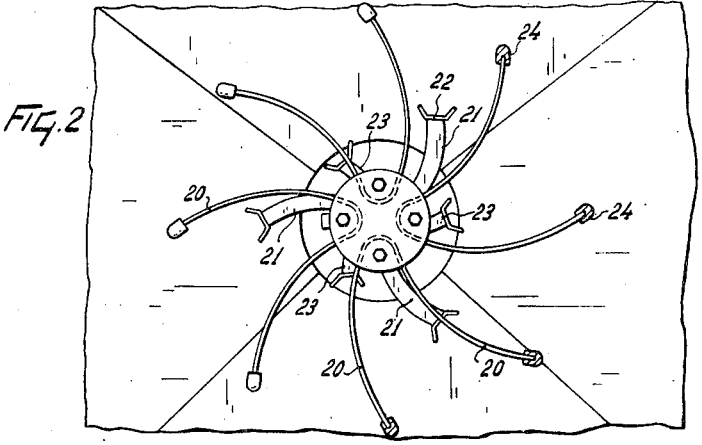
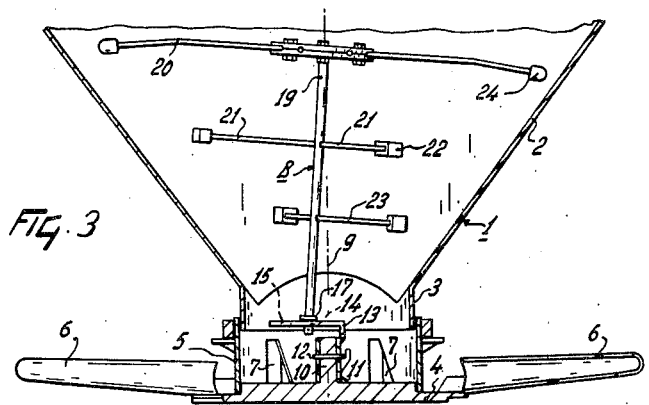
INVENTORS
CORNELIS & ARY VAN DER LELY
BY
Mason, Mason & Albright
— ATTORNEYS June 12, 1962 C. VAN DER LELY ET AL 3,038,643
DEVICES FOR SPREADING GRANULAR OR POWDERY MATERIAL
Filed Jan. 26, 1959 4 Sheets-Sheet 2
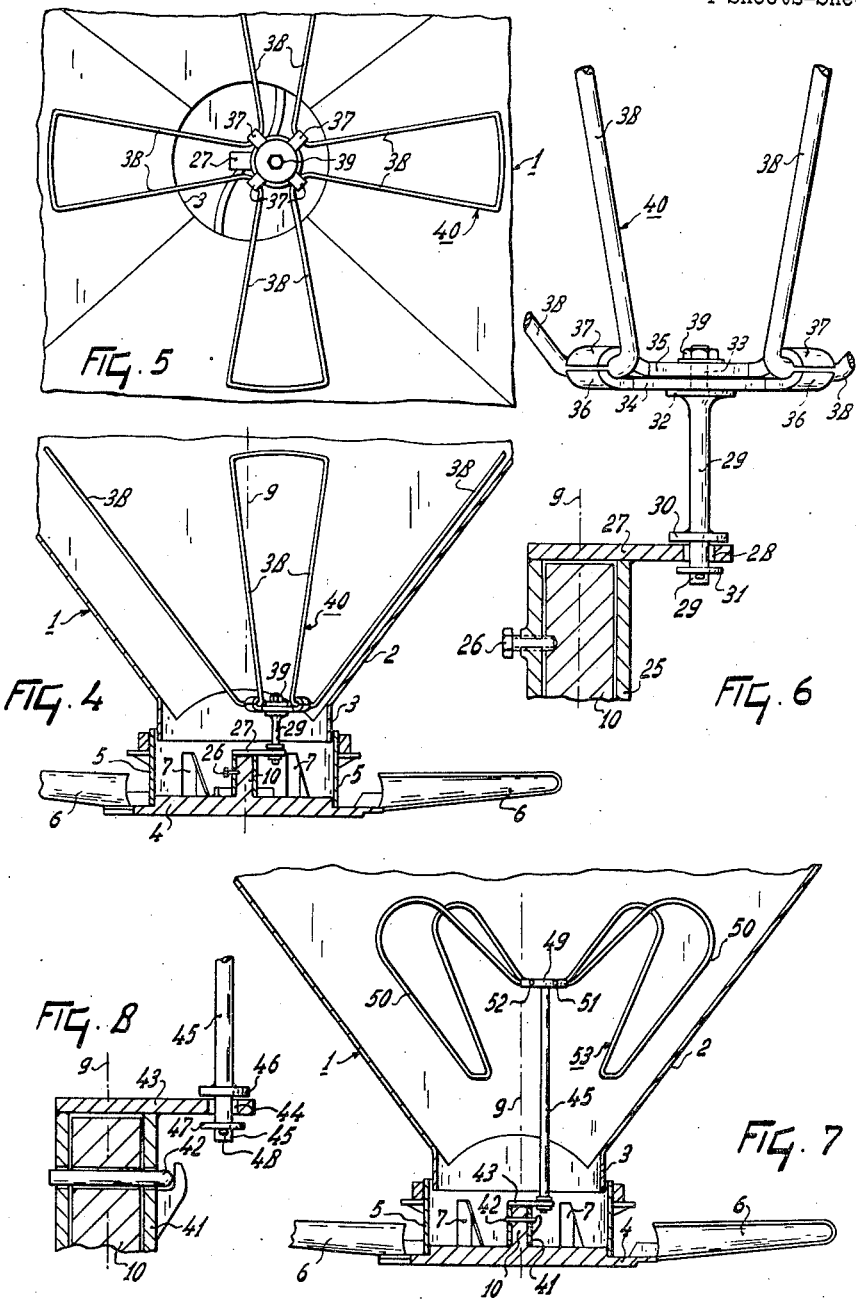
INVENTORS
CORNELIS & ARY VAN DER LELY
BY
Mason, Mason & Albright
ATTORNEYS

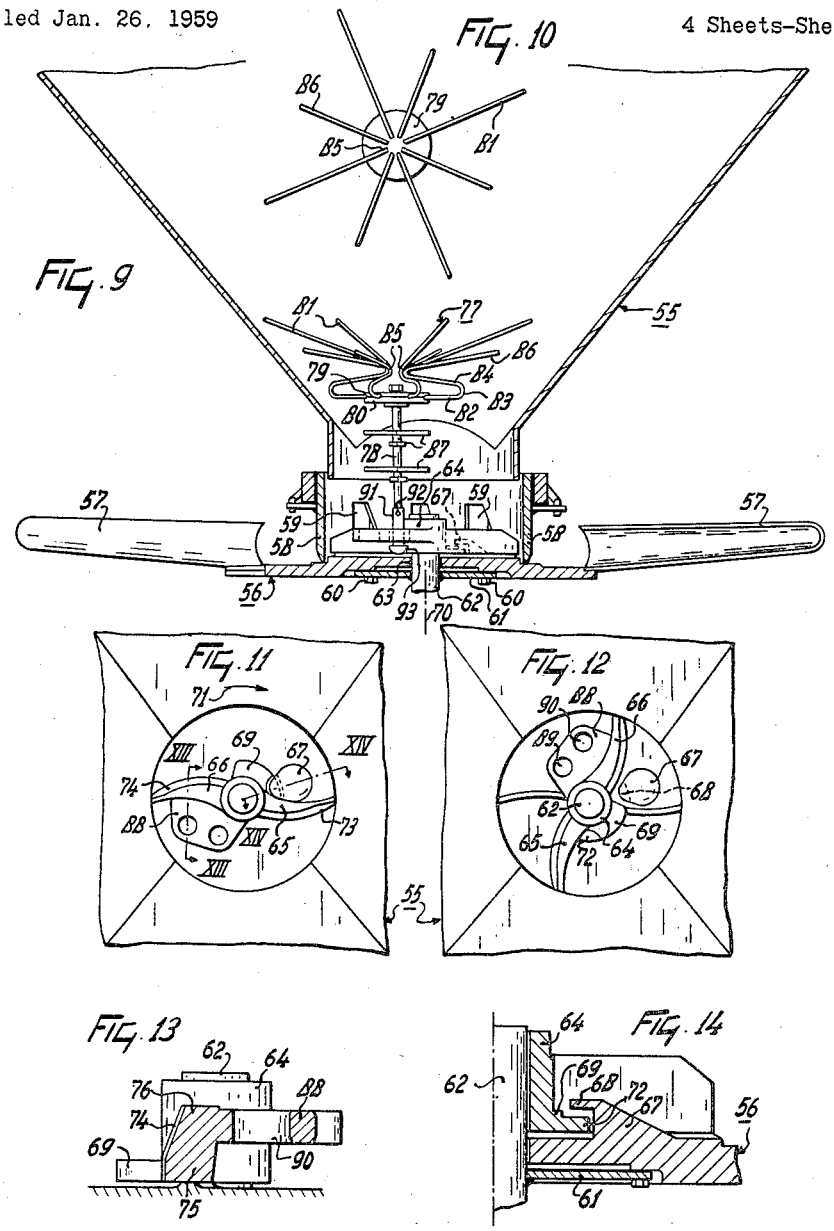

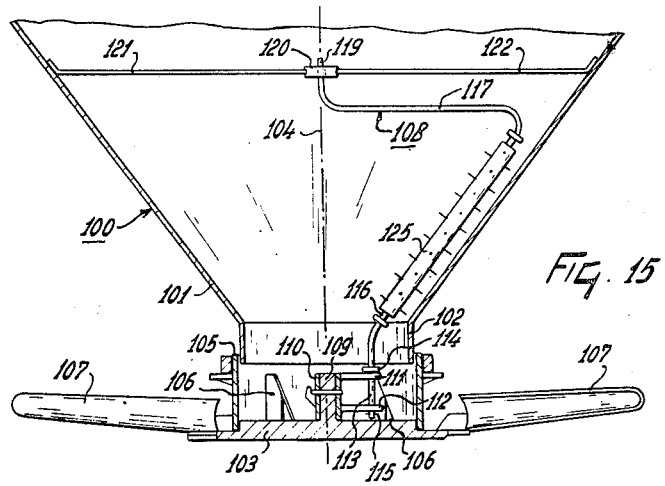
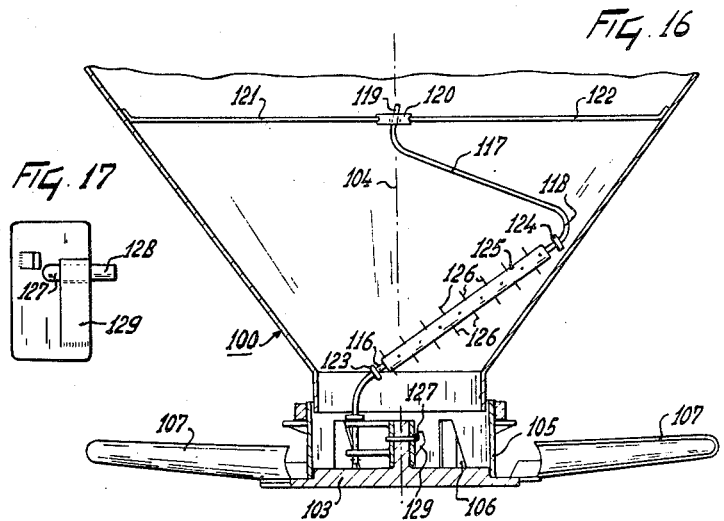

United States Patent Office 3,038,643
Patented June 12, 1962

3,038,643
DEVICES FOR SPREADING GRANULAR
OR POWDERY MATERIAL
Cornelis van der Lely and Ary van der Lely, Maasland, Netherlands, assignors to C. van der Lely N.V., Maasland, Netherlands, a Dutch limited-liability company
Filed Jan. 26, 1959, Ser. No. 788,884
Claims priority, application Netherlands Feb. 3, 1958
16 Claims. (Cl. 222—227)

The invention relates to a device for spreading granular or powdery material, this device comprising a container from which the material is delivered and which comprises an agitating member serving to prevent the material from caking in the container, this agitating member being driven, during operation, by a moving mechanism.

In the known devices of this kind the said member is usually linked to a rotating shaft, so that it performs also a rotary movement. When using such agitating members, the material is nevertheless sometimes apt to cake in the container so that substantially no material is then delivered any longer from the container.

The invention has for its object to cause the agitator to perform such movements that caking of the material is prevented.

In accordance with the invention this is achieved by coupling the agitator with the moving mechanism in a manner such that at least parts of the agitator, during operation, perform a swinging motion.

A simple, readily manufacturable device may be obtained by joining a second rotating shaft and two pivotal shafts, which connect the agitator with the mechanism, to obtain a single pivot in which the three shafts intersect substantially at one point.

With this structure the three shafts may be restricted to one pivot, which can be readily obtained by taking one shaft through a wide hole.

According to a further aspect of the invention the agitator comprises parts made from resilient material. Thus the agitator is readily capable of performing a swinging motion, whilst these parts are capable of giving way resiliently during the movement in the material.

An advantageous structure is obtained, in accordance with the invention, when the driving mechanism moves around a rotary shaft, whilst the agitator is connected with the mechanism at a certain distance from the said rotary shaft. In some circumstances, an advantageous workable agitator is obtained in a device for spreading granular or powdery material, which is supplied to a spreading member from a container, which comprises an agitating member which ensures a satisfactory delivery of the material out of the container, by providing the agitator with extensions, which extend in an upwards direction in the container and which are connected only at their top ends with other parts of the member.

The invention furthermore relates to a device for spreading granular or powdery material, this device comprising a rotating disc, mounted underneath a container, this container comprising internally an agitating member, which is linked to the disc, the agitator and the disc being provided with connecting means of a shape such that the agitator remains fastened to the disc by the rotation of the disc. It is thus possible to attach the agitator rapidly to the disc or to detach it therefrom, so that the agitator can be readily cleaned, whilst, in addition, if desired the device can be rendered suitable, in a simple manner, for use without agitator.

In a device for spreading granular or powdery material, comprising a container which is provided with an outlet part, and in which an agitating member is arranged to prevent caking of the material in the container, to which device the invention pertains, the agitator comprises an extension made from one piece of curved material, this extension having two ends, these ends extend at least substantially radially to a central portion of the agitator and are linked by a bend. An extension constructed in such a way may be capable of resiliently yielding over a large distance from its central position.

With certain embodiments of the device according to the invention it will be advantageous to provide the arms of the agitator with shock-absorbing material, for example rubber or plastic material at the portions liable to come into contact with the container wall. Thus the wall of the container will, as a rule, be less exposed to damage, whilst noise is reduced that would be produced by the movement of the member along the wall.

Further the invention relates to a device for spreading granular or powdery material, comprising a container in which is arranged a movable agitating member of novel type for preventing the material from caking in the container. The agitator comprises an upright portion, around which is rotatably journalled an elongated element, which extends over a length which is at least equal to half the length of the upright portion of the agitator, the element being provided with extensions which are at an angle to the longitudinal direction of the said portions of the agitator.

The structure according to the invention may be used successfully in particular for manure distributors, in which the agitator is arranged in a vertical position and is connected at the lower end with an ejecting disc moving about a shaft.

The invention will be described more fully with reference to a few advantageous embodiments.

FIG. 1 is a sectional view of a container of a device according to the invention, in which the member preventing caking of the material is shown in a side view.

FIG. 2 is a plan view of the device shown in FIG. 1.

FIG. 3 is a sectional view of the container shown in FIG. 1, in which the member occupies a different position.

FIG. 4 is a sectional view of a container as shown in FIG. 1, in which the member is shaped in a different form to prevent the material from caking.

FIG. 5 is a plan view of the device shown in FIG. 4.

FIG. 6 shows, on an enlarged scale, a detail of the device shown in FIG. 4.

FIG. 7 is a sectional view of the container shown in FIG. 1, comprising a second variant of the member preventing the material from caking in the container.

FIG. 8 shows, on an enlarged scale, a detail of the device shown in FIG. 7.

FIG. 9 is a sectional view of a container of a device according to the invention, comprising a different embodiment of the member preventing caking of the material in the container.

FIG. 10 is a plan view of the member in the device shown in FIG. 9.

FIG. 11 is a plan view of a detail of the device shown in FIG. 9.

FIG. 12 is a plan view of the same detail as shown in FIG. 11, part of the device occupying, however, a different position.

FIG. 13 is a sectional view taken on the line XIII—XIII of FIG. 11.

FG. 14 is a sectional view taken on the line XIV—XIV of FIG. 11.

FIG. 15 is a sectional view of a container of a device according to the invention, comprising a different embodiment of the member preventing caking of the material in the container.

FIG. 16 is a sectional view of a container as shown in FIG. 15, the member occupying a different position.

FIG. 17 shows, on an enlarged scale, a view of a detail of the device shown in FIGS. 15 and 16.

As shown in FIGS. 1, 2 and 3, a device according to the invention has a hopper or container 1, comprising a pyramid-shaped portion 2 and a cylindrical portion 3. Underneath the container 1 is arranged a moving mechanism shaped in the form of a disc 4, which constitutes the bottom of the container. Between the disc 4 and the cylindrical portion 3 of the container 1 is provided a cylindrical annulus 5, which constitutes the link between the container 1 and the disc 4. The annulus 5 bears on the disc 4 and fits at its top end around the cylindrical portion 3 of the container. The disc 4, which is caused to rotate during operation, extends beyond the container, where it is provided with spreading members 6, which extend beyond the disc 4, so that the device may be used as a distributing machine. For the delivery of the material from the container, the annulus 5 has various outlet ports 7. The material in the container is also acted upon by the rotation of the disc 4, which constitutes at the same time the ejector owing to its connection with the blades 6, so that the material flows through the openings 7 to the ejector and the blades 6. In order to prevent the material from caking in the container, the supply to the openings 7 being thus inadequate, an agitating member 8 is arranged in the container. This agitator is connected with the disc 4, which is rotatable about the substantially vertical axis 9. The connection of the agitator 8 with the disc 4 is obtained by providing the disc with a shaft 10, the centre line of which coincides with the rotary shaft 9. The shaft 10 is surrounded by a sleeve 11, which is locked by means of a pin 12. The sleeve 11 is provided with linkage means comprising a strip 13, having two holes 14 and 15, located at a certain distance from the shaft 9. The agitator 8 is connected with the disc 4 by providing a shaft 16 of the agitator 8 in the hole 14. The shaft 16 is secured against removal from the hole 14 by means of a ring 17, provided over the strip 13 on the shaft 16, and by means of a pin 18 located below the strip 13 and taken through the shaft 16. The hole 14 is so large that the shaft 16 is capable not only of rotating in this hole about an axis parallel to the shaft 9, but also of tilting to some extent about axes crossing and intersecting the shaft 9 at right angles. The agitator 8 consists of a substantially vertical upward arm 19, provided at the top end with extensions 20 of resilient steel, constituting side arms and made pairwise from one curved piece of wire; by means of a bolt between two side arms. These arms can be secured between two plates provided on the top side of the central arm 19. The arm 19 is provided, at a position lower than the side arms 20, with three arms 21, which constitute horizontal extensions and which are made of strip material, the ends of these arms being provided with feet 22, made of strip material and located in substantially vertical planes. The feet 22 have ends which are at an angle to the radius from the arm 19 through the end of a foot.

At a position below the side arms 21, the arm 19 is provided with side arms 23, constituting extensions and shaped in the same form as the side arms 21, but extending over a smaller length from the arm 19.

The side arms 20, which occupy a higher position and hence are farther away from the disc than the side arms 21, extend over a larger distance from the arm 19 than the arms 21. In this case, the distance between the ends of two opposite side arms 20 will preferably be more than ⅝ of the distance between the opposite sides of the container wall at the level of these side arms.

When the device operates, the material is conveyed from the container through the openings 7 and the disc 4 is set rotating by a motor or by the running wheels of a mobile substructure, on which the device can be mounted, the disc rotating about the rotary shaft 9.

During the rotation of the mechanism 4 about the shaft 9, the agitator 8 which is connected with the mechanism 4 will also move. Since the agitator 8 is connected with the mechanism 4 at a certain distance from the rotary shaft 9, mainly those portions of the agitator 8 which are located beyond the arm 19, will perform an oscillatory motion. This oscillatory motion is obtained by the rotation of the agitator 8 about a first axis 9 and about a second rotary shaft, which coincides substantially with the centre line of the hole 14, parallel to the shaft 9, whilst the agitator 8, owing to the width of the hole 14, is also capable of rotating about a number of horizontal pivotal shafts, of which at least two are at right angles to each other and cross or intersect the rotary axis 9 at right angles. When the container 1 is filled to an extent such that the agitator 8 is still below the surface of the material to be spread, the resistance exerted by the material on the arms 20, 21 and 23 will be of such weight that, when the mechanism 4 rotates, the member 8 will not completely follow this rotating movement. The member 8 will start rotating in the hole 14 about the second rotary shaft. Since the shaft 16 is located at a certain distance from the shaft 9, it will describe a circle, of which the diameter is equal to twice the distance between the shaft 9 and the hole 14. During this movement the arm 19 will not completely follow this movement of the shaft 16 owing to the resistance exerted by the material on the agitator 8. The top end of the arm 19 will substantially not rotate, so that the arm 19 describes, so to say, a cone, the apex of which is the top of the arm 19. The shaft 16 will tilt in the hole 14 about the pivotal shafts, which are at right angles to the centre line of the hole and which cross or intersect the rotary shaft 9 at right angles.

The arms 20, 21 and 23, which do not rotate with the shaft 16 about the shaft 9, since the agitator 8 is rotatable in the hole 14, will be set oscillating since the position of the arm 19 will always vary during the rotation of the strip 13, the oscillatory motion taking place mainly in a vertical direction.

FIGS. 1 and 3 show two different positions which the member 8 could occupy owing to the rotation of the shaft 16 about the axis 9. During the movement from one of these positions to the other, the shaft 16 moves through an angle of 180° about the axis 9. Then the arms 20, 21 and 23, which have not turned about the shaft 9 owing to the resistance exerted by the material, have performed an oscillatory motion in a substantially vertical direction, the arms shown in the plane of the drawing of FIG. 1 on the left-hand side having been displaced upwardly, whereas the arms shown in the plane of the drawing on the right-hand side have been displaced downwardly. During this movement the side arms pass through different intermediate positions between the two positions shown. When passing through these intermediate positions, the side arms perform only small, lateral motions.

When the container becomes empty, the agitator 8 being thus set free from the material, this member 8 will strike the wall, since it will tilt about the pivotal shafts, which cross or intersect the rotary shaft 9 at right angles. The tilting movement is possible owing to the hole 14 being large for the shaft 16.

This striking movement can be performed, since the side arms 20, 21 and 23 are located within a smaller circumference than the circumference of the container 13 at the area of these arms.

Since the member strikes the wall, a caking of the material in the container will furthermore be avoided, when the side arms are no longer in contact with the material, so that also the last portion of material will yet flow out of the container to the outlet ports.

If the material in the container tends to cake, a cavity being thus formed about the moving member in the material, the agitator, since it is capable of tilting about the pivotal axes, will tend to move towards the wall of the container. The agitator will then move continually against the wall of the cavity, so that material is continuously delivered to the outlet ports, whilst the cavity is enlarged and will finally vanish.

The oscillatory motions of the member may, as an alternative, be obtained, when the second rotary shaft and the two pivotal shafts at right angles to each other are not joined in one pivot.

In certain cases it is sufficient for the member to be connected only with the aid of a second rotary shaft with the mechanism; in this case, however, it is usually desired for the rotary shaft to be at acute angle to the first rotary shaft 9, so that the top end of the arm 19 is located at least near the rotary shaft 9. As a further alternative, the oscillatory motions may be obtained by connecting the member with the mechanism by means of a second rotary shaft and one pivotal shaft, which crosses or intersects the first rotary shaft 9. Although in this embodiment the ends of the arms 21 and 23 are provided with feet, of which the ends are at an angle to the radius passing from the arm 9 through the extremities of these feet, a satisfactory action upon the material may be obtained by connecting the ends of these arms by means of a closed ring.

In order to avoid undesirable damage to the container wall, it will be advantageous to provide such a larger length of the resilient side arms 20 than the length of the arms 21 and 23 that they absorb the first shocks against the wall during the swinging movement, so that the more rigid arms 21 and 23 will strike the wall only by light shocks. If desired, the ends of the side arms 20 may be provided with caps 24 of shock-absorbing material, so that the wall of the container is less liable to be damaged, whilst at the same time the noise caused by the side arms 20 when striking the wall is reduced.

FIGS. 4, 5 and 6 show a second embodiment, in which the container and the moving mechanism are shaped in the same form as in the first embodiment and designated by the same reference numerals.

In this embodiment a sleeve 25 is provided on the shaft 10 of the moving mechanism 4, this sleeve being secured against rotation about the shaft 10 by means of a bolt 26. The sleeve 25 is provided with a strip 27, which is provided with a hole 28, located at a certain distance from the rotary shaft 9. Through the hole 28 is taken a shaft 29, the diameter of which is so much smaller than the diameter of the hole 28 that the agitator saft 29 is capable not only of rotating in the hole, but also of tilting about axes which are at right angles to the axis of the hole. The shaft 29 is secured against removal out of the hole 28 by means of a ring 30 and a ring 31. The shaft 29 is provided at the top end with a plate 32 and a wire piece 33. About the wire piece 33 and on the plate 32 are provided two plates 34 and 35, which are provided with tags 36 and 37, between which are clamped portions of the extensions 38, forming side arms. The plates 34 and 35 are held on the shaft 29 by means of a nut 39. The side arms 38 are made from one piece of resilient steel wire.

The side arms 38 with the shaft 29 constitute an agitating member 40, which operates in the same manner as the member 8 of the embodiment shown in FIGS. 1, 2 and 3. The side arms 38 are located in the surface of a cone, the top of which points downwards, the side arms 38 extending mainly along the walls of the container 1. Owing to the resistance exerted by the material in the container 1 on the side arms, these side arms 38 will not be capable of following the rotation of the mechanism 4 around the rotary shaft 9, so that the shaft 29 in the hole 28 will rotate in the same manner as the shaft 16 in the hole 14. Since the hole 28 is located at a certain distance from the shaft 9, the shaft 29 with the arm 27 must rotate about the shaft 9, so that also with this member the side arms 38 will perform a swinging motion as the arms 20, 21 and 23 of the member 8 of the embodiment shown in FIGS. 1 to 3. Since the side arms 38 extend mainly along the wall of the container, the embodiment of this member may be used successfully in particular for material tending to stick to the wall of the container.

FIGS. 7 and 8 show an embodiment which is provided with the same container and the same moving mechanism as those of the foregoing figures. The corresponding parts of this embodiment are designated by the same reference numerals as those of FIGS. 1 to 6.

In this embodiment the shaft 10 is provided with a sleeve 41, which is secured against displacement on the shaft 10 by means of a pin 42. The sleeve 41 is provided with a strip 43 with a hole 44, which is located at a distance from the rotary shaft 9 of the mechanism 4. Through the hole 44 is taken a shaft 45, which is secured against removal from the hole 44 by means of a plate 46, which is welded to the shaft 45 and by means of a ring 47, which is held on the shaft 45 by means of a split pin 48. The shaft 45, which extends upwardly, is provided at its top end with a round plate 49. To the plate 49, which extends horizontally in the central position shown of the shaft 45, are welded side arms 50, which extend upwardly in the container. The plate 49 is provided with six arms 50, which are formed pairwise from one piece of resilient material, the ends, which are not connected to each other, being welded to the plate 49. Each side arm 50 is welded to the plate 49 only at its top end. From the plate 49 a first portion of the side arm, this portion being at an angle to the vertical shaft 45, changes through a bend into a second portion, which points downwardly from the bend and extends along the wall of the container. The portions extending along the container wall are located, in this case, in an imaginable cone surface.

Only four of these side arms 50 are shown, two being omitted; the holes 51 and 52, intended for these two arms, are shown in the plate 49; the ends of the omitted side arms can be arranged therein.

When the disc 4 rotates about the rotary shaft 9, the agitator 53, which is constituted by the side arms 50 and the shaft 45, which is located centrally in front of this member, will move in the material in the container 1 in the same manner as the agitators of the foregoing embodiments.

Since the shafts 45 are provided with fewer side arms than those of the agitator 8, the agitator 53 will move more readily across the material in the container than the member 8 or 40. The side arms are capable of giving way readily in a resilient manner owing to the resilience of the material from which they are made. The resistance experienced by the side arms 50 in the material is, however, usually so heavy that the shaft 45 will always rotate in the hole 44, whilst, since the top end of the shaft 45 cannot always follow the movements of the lower end of the shaft 46, the side arms will continually perform a swinging motion.

FIGS. 9 to 14 show a device comprising a container 55, formed in the same manner as the container 1 of the first embodiment. Underneath the container 55 is arranged a moving mechanism 56 in the form of a disc, which is provided with spreading members 57, which extend outside the container beyond the disc. The mechanism 56 constitutes, as in the foregoing embodiments, the bottom of the container. Between the mechanism 56 and the lower side of the container 55 is arranged an annulus 58, which bears on the mechanism 56, whilst the top end of this annulus fits around the lower end of the container 55. The annulus 58 is provided with outlet ports 59, through which the material is supplied from the container to the spreading members 57. The mechanism 56 is connected with a plate 61 by means of bolts 60, this plate being welded to a shaft 62, driven by a driving mechanism of a motor or by the running wheels supporting the device. The top end of the shaft 62, which is taken through a hole 63 in the disc 56, is surrounded by a bearing 64, which is provided with two blade-shaped members 65 and 66, which are located opposite each other around the bearing. In order to secure the bearing 64 with the blades 65 and 66 against displacement about the shaft 62, provision is made of a lug 67 on the disc 56. The lug 67 has a portion 68, which occupies a higher position than the disc 56. Below this portion can be slipped a plane portion 69 of the bearing 64, so that the bearing 64 cannot be detached from the shaft 62.

When the mechanism 56 moves about the rotary shaft 70, it will rotate in a direction indicated by the arrow 71. Thus the lug 67 which is located over the portion 72 of the plane portion 69, will be urged against the blade 65, which thus constitutes a stop limiting in one direction a rotation of the disc 59 with respect to the bearing 64. The stop thus holds the lug 67 over the portion 69, so that the blades 65 and 66 and the bearing 64 will rotate with the mechanism 56 about the rotary shaft 70.

The blades 65 and 66 are constructed so that, viewed in the direction of rotation 71, the front sides 73 and 74 thereof exhibit a side wall rising upwards to the rear, so that the material cannot stick to the bottom of the container. As shown in FIG. 13, the blade 65, in a section parallel to the shaft 62, is shaped in a form in which the lower end 75 is wider than the top end 76. The section of the blade 66 in a plane parallel to the shaft 62 is shaped in the same form as the blade 65. The blades 65 and 66, viewed from the shaft 62 in the direction of rotation, are slightly curved to the rear, so that, upon rotation, the material arriving in front of these blades is urged towards the outer side of the cylindrical portion 58, so that it will be pushed towards the openings 59 in the ring 58.

In order to prevent caking of the material in the container 55, an agitating member 77 is provided in this embodiment. The agitator 77 comprises a vertical upward extending arm 78, which is provided at the top end with two discs 79 and 80, between which are clamped a plurality of mainly radial extensions 81. The extensions 81, which constitute side arms, are made pairwise from one piece of material, one of these two arms being shorter than the other, so that provision is made of a plurality of long arms 81 and a plurality of short arms 81. Thus the line going through the free ends of the arms 81 forms a figure which is identical to the circumference of the container at the level of these arms. Each arm 81 has two radially orientated ends, which are connected with each other by a bend, one end extending sideways from the central portion formed by the plates 79 and 80 and forming a straight first portion 82, which occupies a horizontal position in the central position of the arm 78. After the straight first portion 82 the arm goes over via a hairpin bend 83 into a slightly upwardly orientated, straight second portion 84, which is located in one plane with the first portion 82. After the straight second portion 84 an arm goes over via a second hairpin bend 85 into a rising, third, straight portion 86, which occupies a higher position than the portion 82 and is at an angle to the portion 82 of about 15° or more. The portion 86 is located in the same vertical plane as the portions 82 and 84. The arms 81 are shaped in a form such that the hairpin bends 85 of these arms are located near one another. When the member moves, the arms 81, which are made from resilient material, are capable of vibrating. During this vibration of the arms 81 the hairpin bends 85 of these arms come into contact with one another, so that the arms 81 will set each other vibrating. If one of the arms 81 vibrates more violently than the other, this stronger vibration will be transferred to the other arms, which is conducive to the looseness of the material.

Underneath the arms 81 the agitator 77 is provided with a plurality of extensions 87, which are shorter and, owing to their shape, more rigid than the arms 81. Two arms 87, viewed from above, are at angles to each other and may be of different lengths similar to the arms 21 and 23.

In order to connect the agitator 77 with the moving mechanism 56, the blade 66 is provided on the rear side with a portion 88, having two holes 89 and 90, of which the hole 90 is farther remote from the shaft 70, than the hole 89. The lower side of the member 77 is connected with the portion 88 of the blade 66 by taking a hollow pin 91 from the lower side through the hole 89, the lower end of the arm 78 being introduced into the cavity of the pin 91 and being secured against removal from this pin by means of a stud 92. Since the diameter of the pin 91 is smaller than the diameter of the hole 89, the member 77 of this embodiment is capable of rotating about a second rotary shaft, which is parallel to the shaft 70, with respect to the mechanism 56, whilst owing to the clearance of the pin 91 in the hole 89, the member 77 is capable of moving about horizontal shafts, which are at an angle of 90° to each other, with respect to the blade 66 and the mechanism 56. The blades 65 and 66, together with the bearing 64 and the lug 69, with which they are made from one piece of cast or sprayed material, constitute, in this case, a connecting member of the agitator, by which the latter can be linked to the shaft 62 and the lug 67, which constitute connecting means for the disc 56. Upon rotation of the mechanism 56, the agitator 77 will move in the same manner across the material as the members 8, 40 and 53 of the foregoing embodiments. This movement may be effected favourably by the discs 79 and 80, which with the arms 81 form a heavy top end of the agitating member. This heavy top end is situated excentric with regard to the rotary shaft 70 in a vertical position of the agitator. The member 77 is secured against displacement from the hole 89 by providing the pin 91 at the lower end with a head 93, which has a diameter exceeding that of the hole 89.

Since the portion 88 is arranged over the disc 56 only to an extent such that the head 93 has only a small amount of play between the mechanism 56 and the portion 87, the member 77 will not be capable of moving in an upward direction. The clearance space between the head 93 and the portion 88 and the member 56 is, however, so large that the swinging motions of the arms 81 and 87, required to prevent caking of the material in the container, are still permitted. The advantage of a connection of the member 77 with the mechanism by means of a small part such as the pin 91 is that the pin 91, which may sometimes be subjected to greater wear than the member 77, can be exchanged readily. It is also possible to make the pin 91 of a material of greater resistance to wear, for example, a synthetic substance, than the material of the member itself.

The connection of the member 77 with the moving mechanism 56 by means of a bearing 64, surrounding the shaft 62 and secured against displacement with respect to the shaft 62 by means of a lug 67, may be very suitable for the case in which the container contains material not tending to cake therein, so that the member 73 can be readily removed. Owing to this connection with the disc 56 the member 77 can be removed in a simple manner by turning the bearing 64 with respect to the shaft 62 so that the bearing 64 occupies a position as shown in FIG. 12. In this position the lug 67 is not located over the portion 69 of the bearing 64, so that the bearing 64 with the blades 65 and 66 and the member 77 can be removed from the shaft 62.

In order to permit a slight upward movement of the blades 65 and 66, which bear on the disc 56, in the event of a small quantity of material penetrating below the blades, the portion 72 is slightly lower than the portion 69, so that, in the working position in which the portion 68 of the lug 67 is located over the portion 72, the space between the portion 68 and the disc 56 is not completely filled by the thickness of the portion 72, the bearing 64 with the blades 65 and 66 being thus slightly movable in a vertical sense.

Although in this embodiment the side arms 81 are curved twice, they may be curved only once, the second straight portion 84 then extending beyond the central portion 78, viewed from the bend 83. It is then possible to form a bend 83 not only through 180°, but even through an angle of 360° or more.

In order to enlarge the swinging motions of the members 8, 40, 53 or 77, the distance of the connection of the member 8 or 77 from the axis of rotation 9 of the mechanism 4 or the axis of rotation 70 of the mechanism 56 may be increased, as is shown in the first embodiment of FIGS. 1, 2 and 3 and in the last-mentioned embodiment shown in FIGS. 9 to 14.

The distance of the connection of the shaft 16 with the mechanism 4 to the rotary shaft 8 (see FIG. 1) may be increased by arranging the shaft 16 in the hole 15, whilst the distance of the connection of the member 77 with the mechanism 56 from the shaft 70 may be enlarged by arranging the pin 91 in the hole 90.

By increasing the said distance, the circle along which the lower end of the members 8 or 77 would move becomes larger, so that also the swinging motions of the side arms of the said members will increase.

Although in the said embodiments the moving mechanisms rotate, all of them, about a shaft, the members preventing caking of the material in the container may, as an alternative, be used with mechanisms performing not a rotation but a rocking movement. If in the case of a rocking mechanism use is made of a blade as the blades 65 and 66, it will be advantageous to provide these blades on each side with rising sides.

By using a member preventing caking of the material in the container, the side walls of a container may be at a larger angle to the vertical plane without involving the disadvantage of inadequate supply of material to the outlet ports of the container. If such a member is not employed, the side walls of the container must, in many cases, be steeper in order to ensure a supply of material to the outlet ports of the container.

Side walls at a larger angle to the vetrical plane have the advantage that the weight of the material in the container is supported by these side walls, so that the pressure exerted on the material in front of the outlet ports of the container will be smaller, and the possibility of choking the outlet ports is reduced.

As shown in FIGS. 15, 16 and 17, a device according to the invention comprises a container 100, which consists of a conical portion 101 and a cylindrical portion 102. Underneath the container 100 provision is made of a mechanism 103, which is capable of rotating about a rotary axis 104, which extends substantially vertically. Between the container 100 and the mechanism 103 is arranged an annulus 105, which is shaped in the same form as the annulus 5 of the first embodiment. The annulus 105 is provided with outlet ports 106. The material delivered through the outlet ports 106 is supplied by way of the mechanism 103, which extends over a small distance beyond the annulus 105, to the spreading members 107, which are provided on the mechanism 103.

In order to ensure a satisfactory supply of material out of the container to the outlet ports 106, an agitating member 108 is arranged inside the container to prevent caking of the material in the container. In order to cause the member 108 to perform a swinging motion, it is connected at the lower end with the mechanism 103 at a distance from the shaft 104. The connection of the member 108 with the mechanism 103 is obtained by means of a stub shaft 109, which is surrounded by a sleeve 110. The sleeve 110 is provided with two tags 111 and 112, having holes through which the shaft 113 of the member 108 is taken. The shaft 113 is secured against displacement in the holes of the plates 111 and 112 by means of a ring 114, arranged on the shaft 113, and by means of a ring 115. The shaft 113 is arranged in the holes of the tags 111 and 112 so that it is capable of turning in these holes. The agitator 108, which may be made of one piece of material, comprises mainly a portion 116, extending in an upward direction in the container and connected with a portion 117 by means of a bend 118.

The end 119 of the straight portion 117 is bent over and journalled in a bearing 120, which is located at a distance from the connection of the agitator 108 with the disc 103 and which is mounted in the container 100 by means of rods 121 and 122. The shaft 113, is integral with the portions 116 and 117; the shaft 113, which is at right angles to the disc 103, goes over via a curved portion into the portion 116, which is at an obtuse angle to the shaft 113. The centre line of the bearing 120 coincides with the axis of rotation 104, whereas the straight portion 117 intersects the axis 104 at an angle of about 90° and the portion 116 extends, in the central position of the agitator (see FIG. 15), mainly along the walls of the container 100. The portion 116 is provided with two rings 123 and 124, between which is arranged a roller 125, which is capable of turning about the portion 116 and is longer than half the length of the portion 116. The length of the roller 125 is slightly smaller than the distance between the rings 123 and 124, so that this roller is movable between the rings in a direction parallel to the portion 116. The roller 125 is provided with pins 126, which are at right angles to the longitudinal direction of the portion 116 and will agitate the material in the container to satisfactory looseness, upon a movement of the member 108.

During the operation of the device the mechanism 103 will rotate about the shaft 104, whilst the plates 111 and 112 and the shaft 113 will follow the said movement about the shaft 104, since the sleeve 110 is rigidly secured to the stub shaft 109. If the container is filled with the material to be spread, the member 108 is not capable of following the rotation of the shaft 113 in the container, since the resistance exerted by the material on the said member will be too heavy. If the portions 116 and 117 of the member 108 cannot follow the shaft 113 during its rotation about the shaft 104, these portions will be deformed, since the position of the shaft 113 changes. These deformations will occur between the state of equilibrium of 108, shown in FIG. 15, and the state in which the shaft 113 is most remote from its state of equilibrium, as is shown in FIG. 16. During the movement of the shaft 113 about the shaft 104, the portions 116 and 117 will perform a swinging motion in a substantially vertical direction. Owing to this swinging motion, during which particularly the pins 126 provided on the roller 125 is capable of performing a scratching movement in the material, the material will be continuously supplied to the ports 106. When the mechanism 103 rotates, the member 108 will always tend to maintain its state of equilibrium, so that it will tend to rotate with the mechanism 103 about the shaft 104. Thus, if the material tends to cake in the container and if the member 108 has made a cavity in the material, the member 108 will continuously be urged against the wall of this cavity, so that it digs continuously further through the material, a constant supply to the ports 106 being thus ensured.

In order to permit a rapid removal of the member 108 out of the container, the sleeve 110 is connected with the shaft 109 by means of a pin 127. This pin 127 has a curved portion 128, which can grasp behind a lug 129 surrounding the sleeve 110.

If it is desired to remove the member 108 from the container, the pin 128 can be readily removed by unhooking the portion 128 from the plate 129 and by withdrawing the pin 127 from the sleeve 110 and the shaft 109, after which the sleeve 110 with the member 108 can be taken out of the container.

A container having an angular shape, as is shown in the first embodiment, has the advantage that, when the member moves along the wall of the container, this member performs thrusts at the corners, so that the material is thus in addition prevented from sticking in the container.

The driving of the member in the manner according to the invention, so that at least portions of the member perform a swinging motion, has the advantage that the energy required to this end need be only small. This is particularly important, when the device is used as a manure distributor, in which the member may be driven from a running wheel.

Apart from preventing the material from caking, the member may, in addition, perform a certain mixing operation, particularly in the lower part of the container. This may be particularly advantageous with manure distributors, if they are to spread a powdery and hence dusty material, for example, Thomas slags. When the container is filled with this powdery material, fairly large quantities of this material may be poured into the container with intermediate additions of water.

By providing a comparatively small diameter of the container at the lower end, the member will mix the material and the water before it is delivered through the outlet ports, so that the material is slightly humid during the distribution and will, as a rule, not cause dust clouds and will therefore be distributed more satisfactorily. This may also be advantageous, if different kinds of manure are to be spread, which have to be mixed prior to the distribution.

What we claim is:

1. A device for spreading granular or powdery material comprising a material holding hopper, a rotary disc forming the bottom of said hopper, an opening in the side of said hopper, power means associated with said disc to transmit rotary motion thereto, an arm, a side arm extending outwardly from said arm, linkage means operatively and eccentrically connecting said arm to said disc, said operative connection comprising a swivel connection, said power means rotating said disc whereby said arm rotates in relation to said linkage means, the rotation of said disc causing said material to be dispensed through said opening, said arm rotating in a substantially conical plane when said hopper contains a substantial amount of material, and after said hopper has been substantially emptied said arm swings outwardly with respect to said linkage means and said side arm contacts the sides of said hopper to dislodge any material thereon.

2. A device for spreading granular or powdery material comprising a material holding hopper, said container having a pyramid-shaped portion and an annulus, a broadcaster beneath said annulus forming at least part of the bottom of said hopper, an opening in the annulus portion of said hopper, power means associated with said broadcaster to transmit rotary motion thereto, an arm extending upwardly in relation to said broadcaster, a side arm extending outwardly from said arm, linkage means operatively and eccentrically connecting said arm to said broadcaster within the annulus portion of said hopper, said operative connection comprising a swivel connection, said power means rotating said broadcaster whereby said arm rotates in relation to said linkage means, the rotation of said broadcaster causing said material to be dispensed through said opening, said arm rotating in a substantially conical plane when said hopper contains a substantial amount of material, and after said hopper has been substantially emptied said arm swings outwardly with respect to said linkage means and contacts the sides of said hopper to dislodge any material thereon.

3. A device for spreading granular or powdery material comprising a material holding hopper, said container having a pyramid-shaped portion and an annulus, a disc forming the bottom of said hopper, an opening in the side of said hopper adjacent said disc, power means associated with said disc, an arm, a side arm extending outwardly from said arm, linkage means operatively and eccentrically connecting said arm to said disc, said operative connection comprising a swivel connection, said power means moving said disc whereby said side arm moves in relation to said linkage means, said arm describing a substantially pendulant motion when said hopper contains a substantial amount of material, and with said hopper substantially empty said arm swings outwardly with respect to said linkage means with said side arm contacting the sides of said hopper to dislodge any material thereon.

4. A device for spreading granular or powdery material comprising a material holding hopper, a rotary member disposed in the lower portion of said hopper, a material outlet in the lower portion of said hopper, a material broadcaster proximate to said outlet, power means associated with said rotary member to transmit rotary motion thereto, an arm, a side arm extending outwardly from said arm, linkage means operatively and eccentrically connecting said arm to said rotary member, said operative connection comprising a swivel connection, said power means rotating said rotary member whereby said side arm rotates in relation to said linkage means, said arm rotating substantially in a conical plane when said hopper contains a substantial amount of material, and after said hopper has been substantially emptied said arm swings outwardly with respect to said linkage means and said side arm contacts the inner walls of said hopper to dislodge any material thereon.

5. A device according to claim 4 wherein said side arm is formed of a resilient rod and including therein two parts radially disposed relative to said arm and connected to each other by at least one bent portion.

6. A device as claimed in claim 4, wherein two of said side arms are arranged substantially opposite to said arm, the portions of said side arms farthest from each other are at a distance from each other which is at least five-eighths of two opposite points of the container wall at the level of the said portions of said side arms.

7. A device for spreading granular or powdery material comprising a material holding hopper, a rotary means in said hopper, an opening in the wall of said hopper, power means associated with said rotary means to transmit rotary motion thereto, an arm extending into said hopper, a side arm extending outwardly from said arm, linkage means operatively and eccentrically connecting said arm to said rotary means, said operative connection comprising a swivel connection, said power means rotating said rotary means whereby said side arm rotates in relation to said linkage means, said arm rotating in a substantially conical plane when said hopper contains a substantial amount of material, and after said hopper has been substantially emptied said arm swings outwardly with respect to said linkage means and said side arm contacts the sides of said hopper to dislodge any material thereon.

8. A device for spreading granular or powdery material comprising a material holding hopper, a rotary means in said hopper, an opening in the wall of said hopper for discharge of material, power means associated with said rotary means to transmit rotary motion thereto, an arm extending into said hopper, a side arm extending outwardly from said arm, the outer end of said side arm being provided with a cap of shock-absorbing material, linkage means operatively and eccentrically connecting said arm to said rotary means, said operative connection comprising a swivel connection, said power means rotating said rotary means whereby said arm swings outwardly with respect to said linkage means and said cap contacts the sides of said hopper when said hopper has been substantially emptied.

9. A device for spreading granular or powdery material comprising a material holding hopper, a rotary disc forming a bottom portion of said hopper, an opening in said hopper leading to said disc, power means associated with said disc to transmit rotary motion thereto, an arm extending upwardly in said hopper, a side arm engaged by said arm and extending outwardly therefrom, a linkage part operatively and eccentrically interconnecting said arm to the central portion of said disc, said operative interconnection including a pivot connection, said power means rotating said disc whereby said side arm rotates in relation to said linkage means, the rotation of said disc causing said material to be dispensed through said opening, said arm rotating in a substantially conical plane when said hopper contains a substantial amount of material, and after said hopper has been substantially emptied said arm pivots outwardly with respect to said hopper and said side arm contacts the sides of said hopper to dislodge any material thereon.

10. A device for spreading granular or powdery material comprising a material holding hopper, a rotary disc forming the bottom of said hopper, an opening in the side of said hopper adjacent said disc, power means associated with said disc to transmit rotary motion thereto, an arm, a side arm extending outwardly from said arm, a strip projecting from said disc, a hole in said strip eccentric to the center of said disc, the lower aspect of said arm loosely embraced in said hole, and said power means rotating said disc whereby said arm rotates in relation to said strip, the rotation of said disc causing said material to be dispensed through said opening, said arm rotating in a substantially conical plane when said hopper contains a substantial amount of material, and after said hopper has been substantially emptied said arm swings outwardly with respect to said strip and said arm contacts the sides of said hopper to dislodge any material thereon.

11. A device according to claim 10 having a plurality of side arms extending normally from said arm.

12. A device according to claim 10 wherein said material holding hopper is of truncated cone form in its upper portion and said arm has a plurality of side arms extending outwardly and upwardly therefrom, said side arms being disposed substantially parallel to the sides of said hopper in the portion having a truncated cone form.

13. A device according to claim 10 having a plurality of side arms connected to said arm, each of said side arms having a first portion which extends from said arm in a direction substantially parallel to the container wall and having a second portion which extends downwardly in respect to said first portion.

14. A device as claimed in claim 13, wherein the front side of said blade member is curved, said curvature being bent backwardly from the shaft relative to the intended direction of rotation of said member, said front side being helically arranged upwardly and backwardly from said disc relative to the said direction of rotation.

15. A device for spreading granular or powdery material comprising a material holding hopper, a rotary disc forming the bottom of said hopper, an opening in the side of said hopper adjacent said disc, power means, a shaft associated with said power means for rotating said disc, said shaft connected centrally to said disc, a shaft portion extending upwardly from the center of said disc, a blade member embracing said shaft portion, a lug part extending from said disc to engage said blade member and limit its rotation on said shaft portion relative to said disc, said blade member including at least one hole eccentric to said shaft, an arm secured loosely in said hole whereby it may swivel therein, said arm extending substantially upwardly in said hopper, a side arm extending outwardly from said arm, and said power means rotating said disc whereby said side arms rotate in relation to said blade member, the rotation of said disc causing said material to be dispensed through said opening, said arm rotating in a substantially conical plane when said hopper contains a substantial amount of material, and after said hopper has been substantially emptied said arm swings outwardly with respect to said blade member and said side arm contacts the sides of said hopper to dislodge any material thereon.

16. A device for spreading granular or powdery material comprising a material holding hopper, a rotary disc forming the bottom of said hopper, an opening in the said hopper leading to said disc, a rotary member disposed in the lower portion of said hopper, power means associated with said rotary member to transmit rotary motion thereteo, an arm, a side arm extending outwardly from said arm, linkage means operatively and eccentrically coupling said arm to said rotary member, said operative coupling comprising a swivel connection, said power means rotating said rotary member whereby said side arm rotates in relation to said linkage means, said side arms rotating substantially in a conical plane relative to the container wall.

References Cited in the file of this patent

UNITED STATES PATENTS

| | | |
|---|---|---|
| 1,714,750 | Aeschbach | May 28, 1929 |
| 2,102,619 | Francis | Dec. 21, 1937 |
| 2,243,996 | Baughman | June 3, 1941 |
| 2,345,063 | Nauta | Mar. 28, 1944 |
| 2,405,824 | Grether | Aug. 13, 1946 |
| 2,435,039 | Harper | Jan. 27, 1948 |
| 2,672,237 | Noble | Mar. 16, 1954 |
| 2,686,045 | Byberg | Aug. 10, 1954 |
| 2,795,358 | Saxlund | June 11, 1957 |
| 2,854,222 | Dening et al. | Sept. 30, 1958 |